United States Patent [19]
Herre

[11] Patent Number: 5,812,971
[45] Date of Patent: Sep. 22, 1998

[54] ENHANCED JOINT STEREO CODING METHOD USING TEMPORAL ENVELOPE SHAPING

[75] Inventor: Juergen Heinrich Herre, Basking Ridge, N.J.

[73] Assignee: Lucent Technologies Inc., Murray Hill, N.J.

[21] Appl. No.: 621,762

[22] Filed: Mar. 22, 1996

[51] Int. Cl.[6] .................................. G10L 3/02; G10L 9/00
[52] U.S. Cl. ............................ 704/230; 704/205; 704/219
[58] Field of Search ..................................... 395/2.2, 2.21, 395/2.14, 2.18, 2.28, 2.29, 2.38, 2.39; 381/1–2

[56] References Cited

U.S. PATENT DOCUMENTS

| | | | |
|---|---|---|---|
| 4,837,617 | 6/1989 | Brusewitz ............................... | 348/409 |
| 4,875,095 | 10/1989 | Matsumoto et al. .................... | 348/409 |
| 4,943,855 | 7/1990 | Bheda et al. ............................ | 358/133 |
| 5,285,498 | 2/1994 | Johnston ..................................... | 381/2 |
| 5,341,457 | 8/1994 | Hall, II et al. .......................... | 395/2.35 |
| 5,511,093 | 4/1996 | Edler et al. .............................. | 375/240 |

FOREIGN PATENT DOCUMENTS

| | | | |
|---|---|---|---|
| 0 497 413 A1 | 1/1992 | European Pat. Off. .......... | H04B 1/66 |
| WO 92/12607 | 7/1992 | WIPO ............................... | H04S 3/00 |

OTHER PUBLICATIONS

Singhal S., "High Quality Audio Coding Using Multipulse LPC" ICASSP '90, pp. 1101–1104.
Badra et al., "ADPCM Compression Of Speech Signals Using A Frequency Domain LMS Algorithm" Devices, Circuits and Systems, 1995 Int'l. Caracas Conference, pp. 313–317.
Mahieux et al., "Transform Coding Of Audio Signals Using Correlation Between Successive Transform Blocks" ICASSP '89 :Acoustics, Speech &Signal Processing Conferenc, pp. 2021–2024.
Boland et al., "High Audio Coding Using Multiphase LPC and Wavelet Decomposition" ICASSP 95: Acoustics, Speech & Signal Processing Conference, vol. 5, pp. 3067–3069.
M.F. Davis et al., "AC–3 Operation, Bitstream Syntax, and Features," *The AES 97th Convention*, San Francisco, CA, Nov. 10–13, 1994, pp. 1–10.
J. Herre et al., "Intensity Stereo Coding," *AES 96th Convention*, Amsterdam, Feb. 26–Mar. 1, 1994, pp. 1–10.
"Coding Of Moving Pictures And Associated Audio," *ISO/IEC*, JTC1/SC29/WG11 NO803, pp. ii, 64–67.

(List continued on next page.)

*Primary Examiner*—David R. Hudspeth
*Assistant Examiner*—Patrick N. Edouard
*Attorney, Agent, or Firm*—Kenneth M. Brown

[57] ABSTRACT

A method and apparatus for performing joint stereo coding of multi-channel audio signals using intensity stereo coding techniques. In particular, predictive filtering techniques are applied to the spectral coefficient data, thereby preserving the time structure of the output signal of each channel, while maintaining the benefit of the high bit rate savings offered by intensity stereo coding. In one illustrative embodiment of the invention, the input signal is decomposed into spectral coefficients by a high-resolution filterbank/transform; the time-dependent masking threshold of the signal is estimated using a perceptual model; a filter performing linear prediction in frequency is applied at the filterbank outputs for each channel; intensity stereo coding techniques are applied for coding both residual signals into one carrier signal; the spectral values of the carrier signal are quantized and coded according to the precision corresponding to the masking threshold estimate; and all relevant information (i.e., the coded spectral values, intensity scaling data and prediction filter data for each channel, as well as the additional side information) is packed into a bitstream and transmitted to the decoder.

24 Claims, 4 Drawing Sheets

OTHER PUBLICATIONS

K. Brandenburg et al., "The ISO/MPEG–Audio Codec: A Generic Standard For Coding Of High Quality Digital Audio," The 92nd AES Convention, Vienna, 1992, pp. 1–22.

M. Link, "An Attack Processing Of Audio Signals For Optimizing The Temporal Characteristics Of A Low Bit–Rate Audio Coding System," The 95th Convention AES, New York, Oct. 1993, pp. 1–11.

R. Rinaldo, G. Calvagno "Image Coding By Block Prediction Of Multiresolution Subimages," *IEEE Transactions On Image Processing*, vol. 4, No. 7, Jul. 1995, pp. 909–920.

H. Krupnik et al., "Fractal Representation Of Images Via The Discrete Wavelet Transform," *Proc. IEEE National Convention of EE in Israel*, Tel–Aviv, Mar. 95, pp. 1–5.

N.S. Jayant et al., "Digital Coding Of Waveforms," Chapters 6.1 and 7.1–7.2, Englewood Cliffs, NJ, Prentice Hall, 1984, pp. 252–363.

ISO/IEC JTC1/SC29/WG11 MPEG, International Standard ISO 11172–3, "Coding Of Moving Pictures And Associated Audio For Digital Storage Media At Up To About 1.5 Mbit/s," Annex C.1.5.3, pp. 80–108.

ENHANCED JOINT STEREO CODING METHOD USING TEMPORAL ENVELOPE SHAPING

CROSS-REFERENCE TO RELATED APPLICATION

The subject matter of this application is related to that of the U.S. patent application of J. Herre, entitled "Perceptual Noise Shaping in the Time Domain via LPC Prediction in the Frequency Domain," Ser. No. 08/585,086, filed on Jan. 16, 1996 and assigned to the assignee of the present invention. "Perceptual Noise Shaping in the Time Domain via LPC Prediction in the Frequency Domain" is hereby incorporated by reference as if fully set forth herein.

FIELD OF THE INVENTION

The present invention relates to the field of audio signal coding and more specifically to an improved method and apparatus for performing joint stereo coding of multi-channel audio signals.

BACKGROUND OF THE INVENTION

During the last several years so-called "perceptual audio coders" have been developed enabling the transmission and storage of high quality audio signals at bit rates of about 1/12 or less of the bit rate commonly used on a conventional Compact Disc medium (CD). Such coders exploit the irrelevancy contained in an audio signal due to the limitations of the human auditory system by coding the signal with only so much accuracy as is necessary to result in a perceptually indistinguishable reconstructed (i.e., decoded) signal. Standards have been established under various standards organizations such as the International Standardization Organization's Moving Picture Experts Group (ISO/MPEG) MPEG1 and MPEG2 audio standards. Perceptual audio coders are described in detail, for example, in U.S. Pat. No. 5,285,498 issued to James D. Johnston on Feb. 8, 1994 and in U.S. Pat. No. 5,341,457 issued to Joseph L. Hall II and James D. Johnston on Aug. 23, 1994, each of which is assigned to the assignee of the present invention. Each of U.S. Pat. Nos. 5,285,498 and 5,341,457 is hereby incorporated by reference as if fully set forth herein.

Generally, the structure of a perceptual audio coder for monophonic audio signals can be described as follows:

The input samples are converted into a subsampled spectral representation using various types of filterbanks and transforms such as, for example, the well-known modified discrete cosine transform (MDCT), polyphase filterbanks or hybrid structures.

Using a perceptual model, one or more time-dependent masking thresholds for the signal are estimated. These thresholds give the maximum coding error that can be introduced into the audio signal while still maintaining perceptually unimpaired signal quality. In particular, these masking thresholds may be individually determined on a sub-band by sub-band basis. That is, each coder frequency band, which comprises a grouping of one or more spectral coefficients, will be advantageously coded together based on a correspondingly determined masking threshold.

The spectral values are quantized and coded (on a coder frequency band basis) according to the precision corresponding to the masking threshold estimates. In this way, the quantization noise may be hidden (i.e., masked) by the respective transmitted signal and is thereby not perceptible after decoding.

Finally, all relevant information (e.g., coded spectral values and additional side information) is packed into a bitstream and transmitted to the decoder.

Accordingly, the processing used in a corresponding decoder is reversed:

The bitstream is decoded and parsed into coded spectral data and side information.

The inverse quantization of the quantized spectral values is performed (on a frequency band basis corresponding to that used in the encoder).

The spectral values are mapped back into a time domain representation using a synthesis filterbank.

Using such a generic coder structure it is possible to efficiently exploit the irrelevancy contained in each signal due to the limitations of the human auditory system. Specifically, the spectrum of the quantization noise can be shaped according to the shape of the signal's noise masking threshold. In this way, the noise which results from the coding process can be "hidden" under the coded signal and, thus, perceptually transparent quality can be achieved at high compression rates.

Perceptual coding techniques for monophonic signals have been successfully extended to the coding of two-channel or multi-channel stereophonic signals. In particular, so-called "joint stereo" coding techniques have been introduced which perform joint signal processing on the input signals, rather than performing separate (i.e., independent) coding processes for each input signal. (Note that as used herein, as used generally, and as is well known to those of ordinary skill in the art, the words "stereo" and "stereophonic" refer to the use of two or more individual audio channels).

There are at least two advantages to the use of joint stereo coding techniques. First, the use of joint stereo coding methods provide for the ability to account for binaural psychoacoustic effects. And, second, the required bit rate for the coding of stereophonic signals may be reduced significantly below the bit rate required to perform separate and independent encodings for each channel.

Generally, the structure of a multi-channel stereophonic perceptual audio coder can be described as follows:

The samples of each input signal are converted into a subsampled spectral representation using various types of filterbanks and transforms, such as, for example, the modified discrete cosine transform (MDCT), polyphase filterbanks or hybrid structures.

Using a perceptual model, the time-dependent masking threshold of the signal is estimated for each channel. This gives the maximum coding error that can be introduced into the audio signal while still maintaining perceptually unimpaired signal quality.

To perform joint stereo coding, portions of the spectral coefficient data are jointly processed to achieve a more efficient representation of the stereo signal. Depending on the joint stereo coding method employed, adjustments may be made to the masking thresholds as well.

The spectral values are quantized and coded according to the precision corresponding to the masking threshold estimate(s). In this way, the quantization noise is hidden (i.e., masked) by the respective transmitted signal and is thereby not perceptible after decoding.

Finally, all relevant information (i.e., the coded spectral values and additional side information) is packed into a bitstream and transmitted to the decoder.

Accordingly, the processing used in the encoder is reversed in the decoder:

The bitstream is decoded and parsed into coded spectral data and side information.

The inverse quantization of the quantized spectral values is carried out.

The decoding process for the joint stereo processing is performed on the spectral values, thereby resulting in separate signals for each channel.

The spectral values for each channel are mapped back into time domain representations using corresponding synthesis filterbanks.

Currently, the two most commonly used joint stereo coding techniques are known as "Mid/Side" (M/S) stereo coding and "intensity" stereo coding. The structure and operation of a coder based on M/S stereo coding is described, for example, in U.S. Pat. No. 5,285,498 (see above). Using this technique, binaural masking effects can be advantageously accounted for and, in addition, a certain amount of signal-dependent gain may be achieved.

The intensity stereo method, however, provides a higher potential for bit saving. In particular, this method exploits the limitations of the human auditory system at high frequencies (e.g., frequencies above 4 kHz), by transmitting only one set of spectral coefficients for all jointly coded channel signals, thereby achieving a significant savings in data rate. Coders based on the intensity stereo principle have been described in numerous references including European Pat. Application 0 497 413 A1 by R. Veldhuis et al., filed on Jan. 24, 1992 and published on Aug. 5, 1992, and (using different terminology) PCT patent application WO 92/12607 by M. Davis et al., filed on Jan. 8, 1992 and published on Jul. 23, 1992. For purposes of background information, both of these identified references are hereby incorporated by reference as if fully set forth herein.

By applying joint stereo processing to the spectral coefficients prior to quantization, additional savings in terms of the required bit rate can be achieved. For the case of intensity stereo coding, some of these savings derive from the fact that the human auditory system is known to be insensitive to phase information at high frequencies (e.g., frequencies above 4 kHz). Due to the characteristics of human hair cells, signal envelopes are perceptually evaluated rather than the signal waveform itself. Thus, it is sufficient to code the envelope of these portions of a signal, rather than having to code its entire waveform. This may, for example, be accomplished by transmitting one common set of spectral coefficients (referred to herein as the "carrier signal") for all participating channels, rather than transmitting separate sets of coefficients for each channel. Then, in the decoder, the carrier signal is scaled independently for each signal channel to match its average envelope (or signal energy) for the respective coder block.

The following processing steps are typically performed for intensity stereo encoding/decoding on a coder frequency band basis:

From the spectral coefficients of all participating channels, one "carrier" signal is generated that is suited to represent the individual channel signals. This is usually done by forming linear combinations of the partial signals.

Scaling information is extracted from the original signals describing the envelope or energy content in the particular coder frequency band.

Both the carrier signal and the scaling information are transmitted to the decoder.

In the decoder, the spectral coefficients of the carrier signal are reconstructed. The spectral coefficients for each channel are then calculated by scaling the carrier signal using the respective scaling information for each channel.

As a result of this approach, only one set of spectral coefficients (i.e., the coefficients of the carrier signal) needs to be transmitted, together with a small amount of side information (i.e., the scaling information), instead of having to transmit a separate set of spectral components for each channel signal. For the two-channel stereo case, this results in a saving of almost 50% of the data rate for the intensity coded frequency regions.

Despite the advantages of this approach, however, excessive or uncontrolled application of the intensity stereo coding technique can lead to deterioration in the perceived stereo image, because the detailed structure of the signals over time is not preserved for time periods smaller than the granularity of the coding scheme (e.g., 20 ms per block). In particular, as a consequence of the use of a single carrier, all output signals which are reconstructed therefrom are necessarily scaled versions of each other. In other words, they have the same fine envelope structure for the duration of the coded block (e.g., 10–20 ms). This does not present a significant problem for stationary signals or for signals having similar fine envelope structures in the intensity stereo coded channels.

For transient signals with dissimilar envelopes in different channels, however, the original distribution of the envelope onsets between the coded channels cannot be recovered. For example, in a stereophonic recording of an applauding audience, the individual envelopes will be very different in the right and left channels due to the distinct clapping events happening at different times in both channels. Similar effects will occur for recordings produced by using stereophonic microphones, such that the spatial location of a sound source is, in essence, encoded as time differences or delays between the respective channel signals. Consequently, the stereo image quality of an intensity stereo coded/decoded signal will decrease significantly in these cases. The spatial impression tends to narrow, and the perceived stereo image tends to collapse into the center position. For critical signals, the achieved quality can no longer be considered acceptable.

Several strategies have been proposed in order to avoid deterioration in the stereo image of an intensity stereo encoded/decoded signal. Since using intensity stereo coding involves the risk of affecting the stereo image, it has been proposed to use the technique only in cases when the coder runs out of bits, so that severe quantization distortions, which would be perceived by the listener as being even more annoying, can be avoided. Alternatively, an algorithm can be employed which detects dissimilarities in the fine temporal structures of the channels. If a mismatch in envelopes is detected, intensity stereo coding is not applied in the given block. Such an approach is described, for example, in "Intensity Stereo Coding" by J. Herre et al., 96th Audio Engineering Society Convention, Amsterdam, February 1994. However, it is an obvious drawback of the prior proposed solutions that the potential for bit savings can no longer be fully exploited, given that the intensity stereo coding is disabled for such signals.

SUMMARY OF THE INVENTION

In accordance with an illustrative embodiment of the present invention, the drawbacks of prior art techniques are overcome by a method and apparatus for performing joint stereo coding of multi-channel audio signals using intensity stereo coding techniques. In particular, predictive filtering techniques are applied to the spectral coefficient data, thereby preserving the fine time structure of the output signal of each channel, while maintaining the benefit of the high bit rate savings offered by intensity stereo coding. In one illustrative embodiment of the present invention, a method for enhancing the perceived stereo image of intensity stereo encoded/decoded signals is provided by applying the following processing steps in an encoder for two-channel stereophonic signals:

The input signal of each channel is decomposed into spectral coefficients by a high-resolution filterbank/transform.

Using a perceptual model, the one or more time-dependent masking thresholds are estimated for each channel. This advantageously gives the maximum coding error that can be introduced into the audio signal while still maintaining perceptually unimpaired signal quality.

For each channel, a filter performing linear prediction in frequency is applied at the filterbank outputs, such that the residual, rather than the actual filterbank output signal, is used for the steps which follow.

Intensity stereo coding techniques are applied for coding both residual signals into one carrier signal.

The spectral values of the carrier signal are quantized and coded according to the precision corresponding to the masking threshold estimate(s).

All relevant information (i.e., the coded spectral values, intensity scaling data and prediction filter data for each channel, as well as additional side information) is packed into a bitstream and transmitted to the decoder.

Similarly, a decoder for joint stereo encoded signals, corresponding to the above-described illustrative encoder and in accordance with another illustrative embodiment of the present invention, carries out the following processing steps:

The bitstream is decoded and parsed into coded spectral data and side information.

An inverse quantization of the quantized spectral values for the carrier signal is performed.

Intensity stereo decoding is performed on the spectral values of the carrier signal, thereby producing (residual) signals for each channel.

For each channel, inverse prediction filters, operating in frequency and corresponding to the prediction filters applied by the encoder used to encode the original signal, are applied to the residual signals.

The spectral values produced by the inverse prediction filters are mapped back into time domain representations using synthesis filterbanks.

DETAILED DESCRIPTION

Overview

Figure 1:
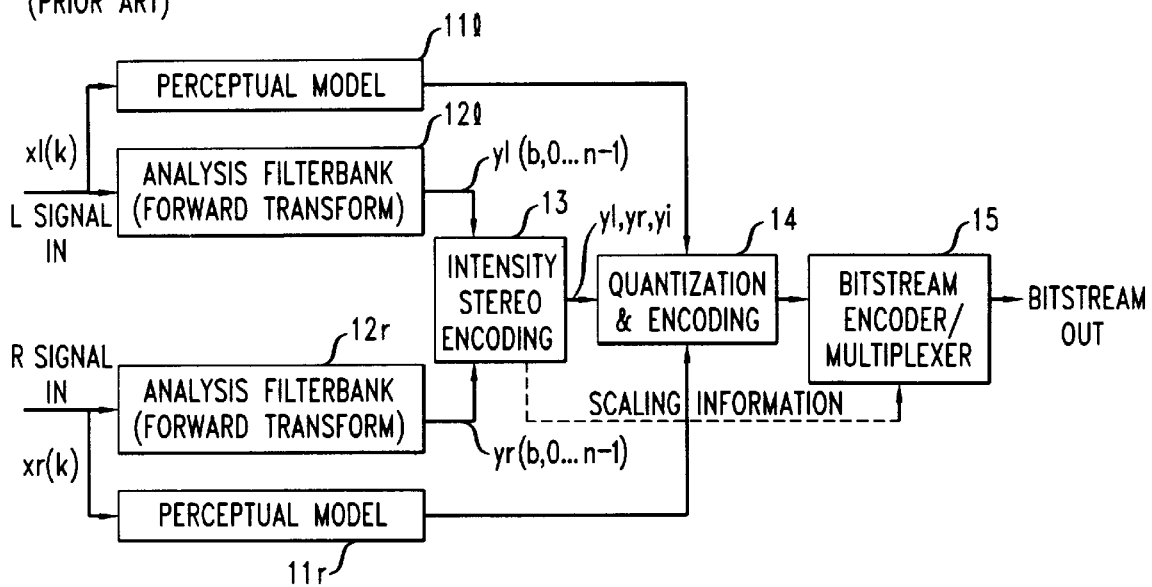
FIG. 1 shows a prior art encoder for two-channel stereophonic signals in which conventional intensity stereo coding techniques are employed.

The incorporation of a predictive filtering process into the encoder and decoder in accordance with certain illustrative embodiments of the present invention advantageously enhances the quality of the intensity stereo encoded/decoded signal by overcoming the limitation of prior art schemes whereby identical fine envelope structures are produced in all intensity stereo decoded channel signals. In particular, the illustrative encoding method overcomes the drawbacks of prior techniques by effectively extending the filterbank with the predictive filtering stage, such that the envelope information common over frequency is extracted as filter coefficients, and is, for the most part, stripped from the residual signal.

Specifically, for each input channel signal, a linear prediction is carried out on its corresponding spectral coefficient data, wherein the linear prediction is performed over frequency. Since predictive coding is applied to spectral domain data, the relations known for classical predictions are valid with the time and frequency domains interchanged. For example, the prediction error signal ideally has a "flat" (square of the) envelope, as opposed to having a "flat" power spectrum (a "pre-whitening" filter effect). The fine temporal structure information for each channel signal is contained in its prediction filter coefficients. Thus, it can be assumed that the carrier signal used for intensity stereo coding will also have a flat envelope, since it is generated by forming linear combinations of the (filtered) channel signals.

In a corresponding decoder in accordance with an illustrative embodiment of the present invention, each channel signal is re-scaled according to the transmitted scaling information, and the inverse filtering process is applied to the spectral coefficients. In this way, the inverse "pre-whitening" process is performed on the envelope of each decoded channel signal, effectively re-introducing the envelope information into the spectral coefficients. Since this is done individually for each channel, the extended encoding/decoding system is capable of reproducing different individual fine envelope structures for each channel signal. Note that, in effect, using a combination of filterbank and linear prediction in frequency is equivalent to using an adaptive filterbank matched to the envelope of the input signal. Since the process of envelope shaping a signal can be performed either for the entire spectrum of the signal or for only part thereof, this time-domain envelope control can be advantageously applied in any necessary frequency-dependent fashion.

And in accordance with another embodiment of the present invention, the bitstream which is, for example, generated by the illustrative encoder described above (and described in further detail below with reference to FIGS. 2, 3 and 7) may be advantageously stored on a storage medium such as a Compact Disc or a Digital Audio Tape, or stored in a semiconductor memory device. Such a storage medium may then be "read back" to supply the bitstream for subsequent decoding by, for example, the illustrative decoder described above (and described in further detail below with reference to FIGS. 5, 6 and 8). In this manner, a substantial quantity of audio data (e.g., music) may be compressed onto the given storage medium without loss of (perceptual) quality in the reconstructed signal.

A Prior Art Encoder

FIG. 1 shows a prior art perceptual encoder for two-channel stereophonic signals in which conventional intensity stereo coding techniques are employed. The encoder of FIG. 1 operates as follows:

The left and right input signals, xl(k) and xr(k), are each individually decomposed into spectral coefficients by analysis filterbank/transform modules 12*l* and 12*r*, respectively, resulting in corresponding sets of "n" spectral components, yl(b,0 . . . n−1) and yr(b,0 . . . n−1), respectively, for each analysis block b, where "n" is the number of spectral coefficients per analysis block (i.e., the block size). Each spectral component yl(b,i) or yr(b,i) is associated with an analysis frequency in accordance with the particular filterbank employed.

For each channel, perceptual model 11*l* or 11*r* estimates the required coding precision for perceptually transparent quality of the encoded/decoded signal. This estimation data may, for example, be based on the minimum signal-to-noise ratio (SNR) required in each coder band, and is passed to the quantization/encoding module.

The spectral values for both the left and the right channel, yl(b,0 . . . n−1) and yr(b,0 . . . n−1), are provided to intensity stereo encoding module 13, which performs conventional intensity stereo encoding. For portions of the spectrum which are to be excluded from intensity stereo coding, the corresponding values of yl(b,0 . . . n−1) and yr(b,0 . . . n−1) may be passed directly to the quantization and coding stage. For portions of the spectrum which are to make use of intensity stereo coding (i.e., preferably the high-frequency portions thereof), the intensity stereo coding process is performed as follows. From each of the signals yl( ) and yr( ), scaling information is extracted for each coder frequency band (e.g., peak amplitude or total energy), and a single carrier signal yi( ) is generated by combining the corresponding yl( ) and yr( ) values. Thus, for spectral portions coded in intensity stereo, only one set of values yi( ) for both channels, plus scaling side information for each channel, is provided to the quantization and coding stage. Alternatively, combined scaling information for both channels together with directional information can be used (along with the single carrier signal).

The spectral components at the output of the intensity stereo encoding stage, consisting of separate values yl( ) and yr( ) and common values yi( ), are quantized and mapped to transmission symbols by quantization and encoding module 14. This module takes into account the required coding precision as determined by perceptual models 11*l* and 11*r*.

The transmission symbol values generated by quantization and encoding module 14, together with further side information, are passed to bitstream encoder/multiplexer 15 and are thereby transmitted in the encoded bitstream. For coder frequency bands which use intensity stereo coding, the scaling information delivered by intensity stereo encoding module 13 is also provided to bitstream encoder/multiplexer 15 and thereby transmitted in the encoded bitstream as well.

An Illustrative Encoder

Figure 2:
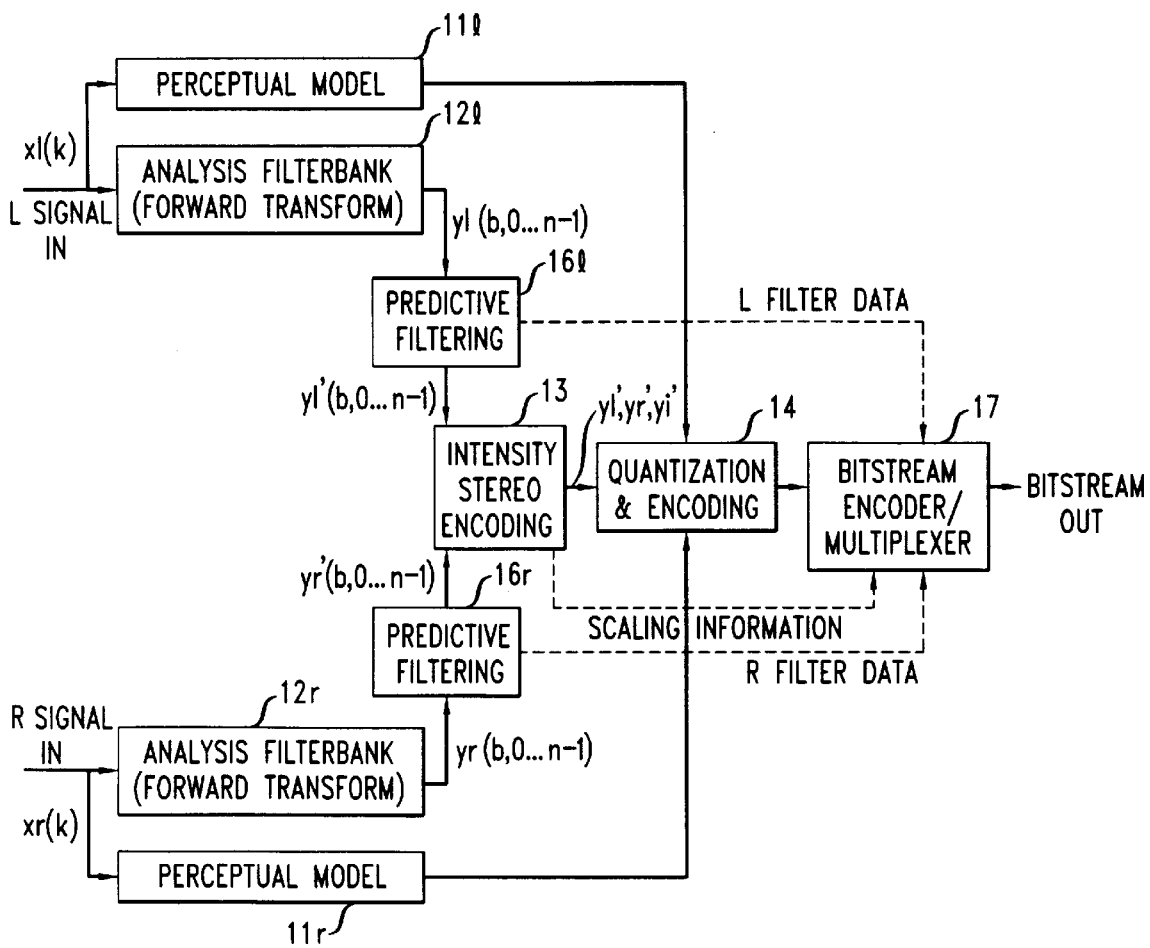
FIG. 2 shows an encoder for two-channel stereophonic signals in accordance with an illustrative embodiment of the present invention.

FIG. 2 shows an encoder for two-channel stereophonic signals in accordance with an illustrative embodiment of the present invention. The operation of the illustrative encoder of FIG. 2 is similar to that of the prior art encoder shown in FIG. 1, except that, for each channel, a predictive filtering stage is introduced between the corresponding analysis filterbank and the intensity stereo encoding module. That is, predictive filters 16*l* and 16*r* are applied to the outputs of analysis filterbanks 12*l* and 12*r*, respectively. As such, the spectral values, yl(b,0 . . . n−1) and yr(b,0 . . . n−1), are replaced by the output values of the predictive filtering process, yl'(b,0 . . . n−1) and yr'(b,0 . . . n−1), respectively, before being provided to intensity stereo encoding module 13.

Figure 3:
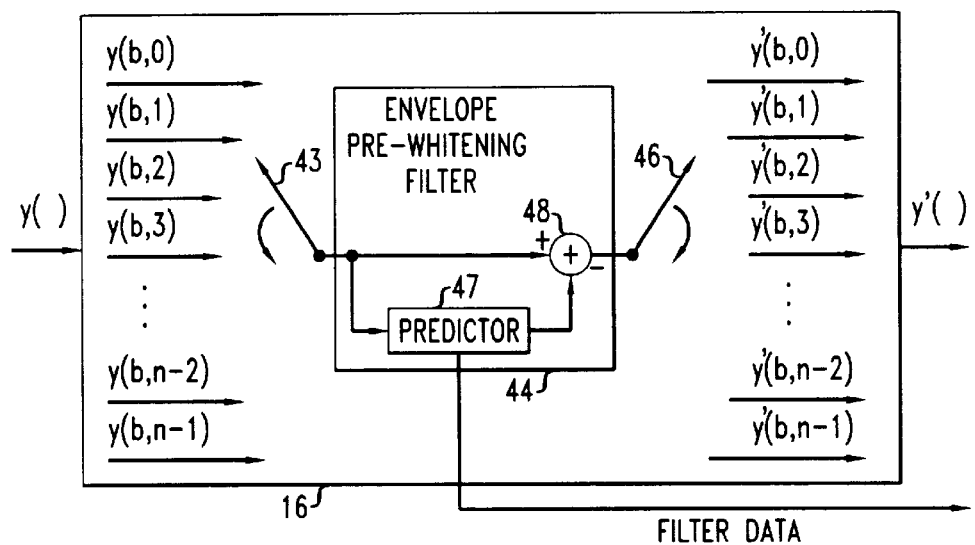
FIG. 3 shows an illustrative implementation of the predictive filters of the illustrative encoder of FIG. 2.

FIG. 3 shows an illustrative implementation of the predictive filters of the illustrative encoder of FIG. 2. Specifically, inside the predictive filtering stage for each channel, a linear prediction is performed across frequency (as opposed, for example, to predictive coding which is performed across time, such as is employed by subband-ADPCM coders). To this end, "rotating switch" 43 operates to bring spectral values y(b,0 . . . n−1) into a serial order prior to processing, and the resulting output values y'(b,0 . . . n−1) are provided in parallel thereafter by "rotating switch" 46. (Note that the use of "rotating switches" as a mechanism for conversion between serial and parallel orderings is used herein only for the purpose of convenience and ease of understanding. As will be obvious to those of ordinary skill in the art, no such physical switching device need be provided. Rather, conversions between serial and parallel orderings may be performed in any of a number of conventional ways familiar to those skilled in the art, including by the use of software alone.) Although the illustrative embodiment shown herein performs the processing of the spectral values in order of increasing frequency, alternative embodiments may, for example, perform the processing thereof in order of decreasing frequency. Other orderings are also possible, as would be clear to one of ordinary skill in the art.

Specifically, as can be seen from the figure, the resultant output values, y'(b,0 . . . n−1), are computed from the input values, y(b,0 . . . n−1), by subtracting (with use of subtractor 48) the predicted value (predicted by predictor 47) from the input values, so that only the prediction error signal is passed on. Note that the combination of predictor 47 and subtractor 48, labelled in the figure as envelope pre-whitening filter 44, functions to equalize the temporal shape of the corresponding time signal.

The process performed by predictive filters 16*l* and 16*r* of the illustrative encoder of FIG. 2 can be performed either for the entire spectrum (i.e., for all spectral coefficients), or, alternatively, for only a portion of the spectrum (i.e., a subset of the spectral coefficients). Moreover, different predictor filters (e.g., different predictors 47 as shown in FIG. 3) can be used for different portions of the signal spectrum. In this manner, the above-described method for time-domain envelope control can be applied in any necessary frequency-dependent fashion.

In order to enable the proper decoding of the signal the bitstream advantageously includes certain additional side information. For example, one field of such information might indicate the use of predictive filtering and, if applicable, the number of different prediction filters. If predictive filtering is used, additional fields in the bitstream may be transmitted for each prediction filter indicating the target frequency range of the respective filter and its filter coefficients. Thus, as shown in FIG. 2 by the dashed lines labelled "L Filter Data" and "R Filter Data," predictive filters 16l and 16r provide the necessary information to bitstream encoder/multiplexer 17 for inclusion in the transmitted bitstream.

Figure 7:
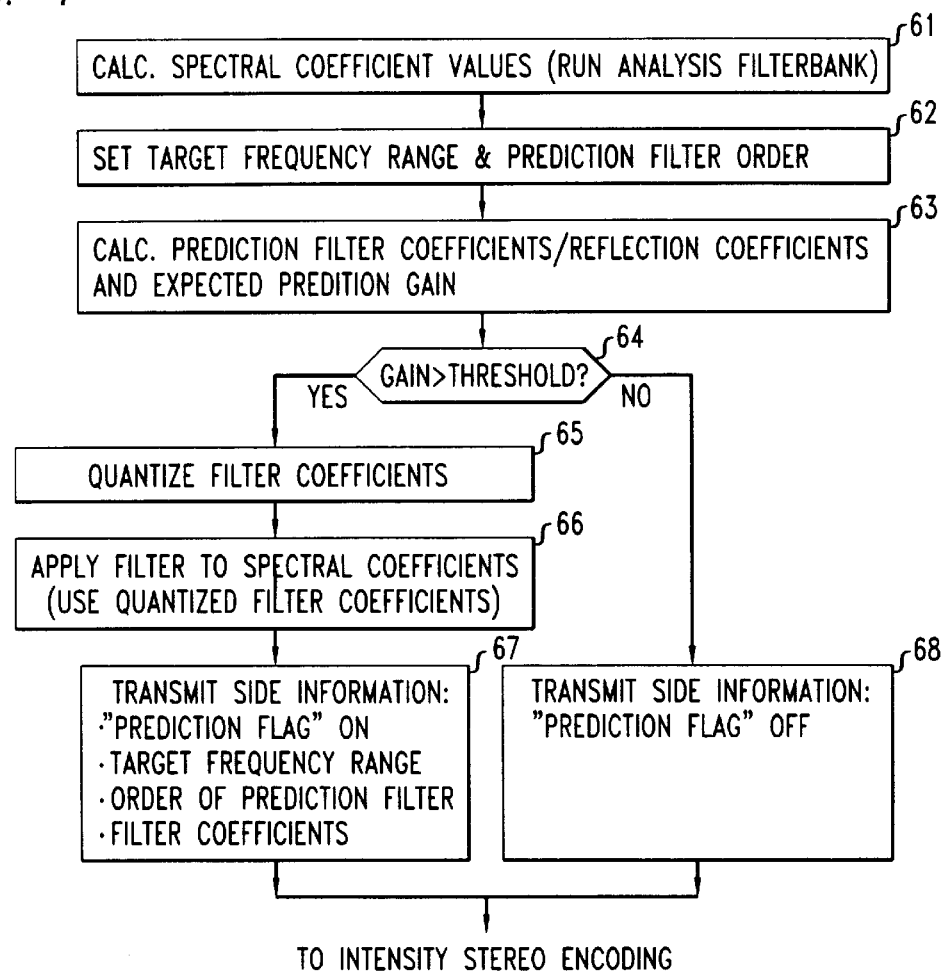
FIG. 7 shows a flow chart of a method of encoding two-channel stereophonic signals in accordance with an illustrative embodiment of the present invention.

FIG. 7 shows a flow chart of a method of encoding two-channel stereophonic signals in accordance with an illustrative embodiment of the present invention. The illustrative example shown in this flow chart implements certain relevant portions of the illustrative encoder of FIG. 2. Specifically, the flow chart shows the front-end portion of the encoder for a single one of the channels, including the envelope pre-whitening process using a single prediction filter. This pre-whitening process is carried out after the calculation of the spectral values by the analysis filterbank, as shown in step 61 of the figure.

Specifically, after the analysis filterbank is run, the order of the prediction filter is set and the target frequency range is defined (step 62). These parameters may illustratively be set to a filter order of 15 and a target frequency range comprising the entire frequency range that will be coded using intensity stereo coding (e.g., from 4 kHz to 20 kHz). In this manner, the scheme is advantageously configured to provide one set of individual fine temporal structure data for each audio channel. In step 63, the prediction filter is determined by using the range of spectral coefficients matching the target frequency range, and by applying a conventional method for predictive coding as is well known, for example, in the context of Differential Pulse Code Modulation (DPCM) coders. For example, the autocorrelation function of the coefficients may be calculated and used in a conventional Levinson-Durbin recursion algorithm, well known to those skilled in the art. As a result, the predictor filter coefficients, the corresponding reflection coefficients ("PARCOR" coefficients), and the expected prediction gain are known.

If the expected prediction gain exceeds a certain threshold (e.g., 2 dB), as determined by decision 64, the predictive filtering procedure of steps 65 through 67 is used. In this case, the prediction filter coefficients are quantized (in step 65) as required for transmission to the decoder as part of the side information. Then, in step 66, the prediction filter is applied to the range of spectral coefficients matching the target frequency range where the quantized filter coefficients are used. For all further processing, therefore, the spectral coefficients are replaced by the output of the filtering process. Finally, in step 67, a field of the bitstream to be transmitted is set to indicate the use of predictive filtering ("prediction flag" on). In addition, the target frequency range, the order of the prediction filter, and information describing its filter coefficients are also included in the bitstream.

If, on the other hand, the expected prediction gain does not exceed the decision threshold as determined by decision 64, step 68 sets a field in the bitstream to indicate that no predictive filtering has been used ("prediction flag" off). Finally, after the above-described processing is complete, conventional steps as performed in prior art encoders (such as those carried out by the encoder of FIG. 1) are performed—that is, the intensity stereo encoding process is applied to the spectral coefficients (which may now be residual data), the results of the intensity stereo encoding process are quantized and encoded, and the actual bitstream to be transmitted is encoded for transmission (with the appropriate side information multiplexed therein). Note, however, that bitstream encoder/multiplexer 17 of the illustrative encoder of FIG. 2 replaces conventional bitstream encoder/multiplexer 15 of the prior art encoder of FIG. 1, so that the additional side information provided by predictive filters 16l and 16r (i.e., "L Filter Data" and "R Filter Data") may be advantageously encoded and transmitted in the resultant bitstream.

A Prior Art Decoder

Figure 4:
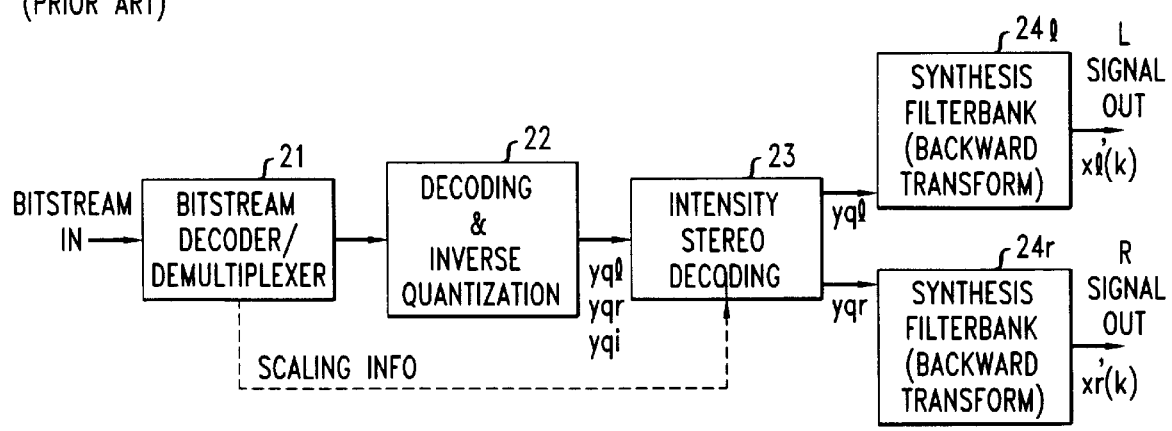
FIG. 4 shows a prior art decoder for joint stereo coded signals, corresponding to the prior art encoder of FIG. 1, in which conventional intensity stereo coding techniques are employed.

FIG. 4 shows a prior art decoder for joint stereo coded signals, corresponding to the prior art encoder of FIG. 1, in which conventional intensity stereo coding techniques are employed. Specifically, the decoder of FIG. 4 performs the following steps:

The incoming bitstream is parsed by bitstream decoder/demultiplexer 21, and the transmission symbols for the spectral coefficients are passed on to decoding and inverse quantization module 22, together with the quantization related side information.

In decoding and inverse quantization module 22, the quantized spectral values, yql( ), yqr( ) and yqi( ), are reconstructed. These signals correspond to the independently coded left channel signal portion, the independently coded right channel signal portion, and the intensity stereo carrier signal, respectively.

From the reconstructed spectral values of the carrier signal and the transmitted scaling information, the missing portions of the yql( ) and yqr( ) spectra for the left and right channel signals are calculated with use of a conventional intensity stereo decoding process, which is performed by intensity stereo decoding module 23. At the output of this module, two complete (and independent) channel spectral signals, yql( ) and yqr( ), corresponding to the left and right channels, respectively, are available.

Finally, each of the left and right channel spectral signals, yql( ) and yqr(), are mapped back into a time domain representation by synthesis filterbanks 24l and 24r, respectively, thereby resulting in the final output signals xl'(k) and xr'(k).

An Illustrative Decoder

Figure 5:
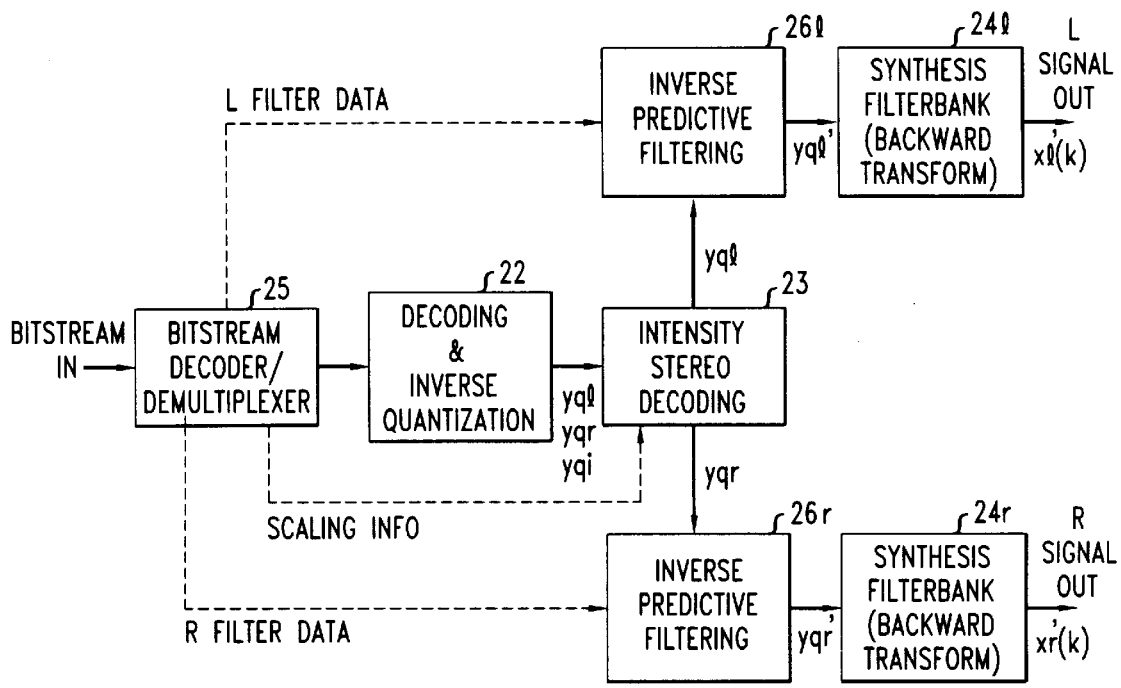
FIG. 5 shows a decoder for joint stereo coded signals, corresponding to the illustrative encoder of FIG. 2, in accordance with an illustrative embodiment of the present invention.

FIG. 5 shows a decoder for joint stereo coded signals, corresponding to the illustrative encoder of FIG. 2, in accordance with an illustrative embodiment of the present invention. The operation of the illustrative decoder of FIG. 5 is similar to that of the prior art decoder shown in FIG. 4, except that, for each channel, an inverse predictive filtering stage is introduced between the intensity stereo decoding and the corresponding synthesis filterbanks. That is, inverse predictive filters 26l and 26r are inserted prior to synthesis filterbanks 24l and 24r, respectively. Thus, the spectral values, yql( ) and yqr( ), as generated by intensity stereo decoding module 23, are replaced by the output values of the corresponding inverse predictive filtering processes, yql'( ) and yqr'( ), respectively, before being provided to their corresponding synthesis filterbanks (synthesis filterbanks 24l and 24r).

Figure 6:
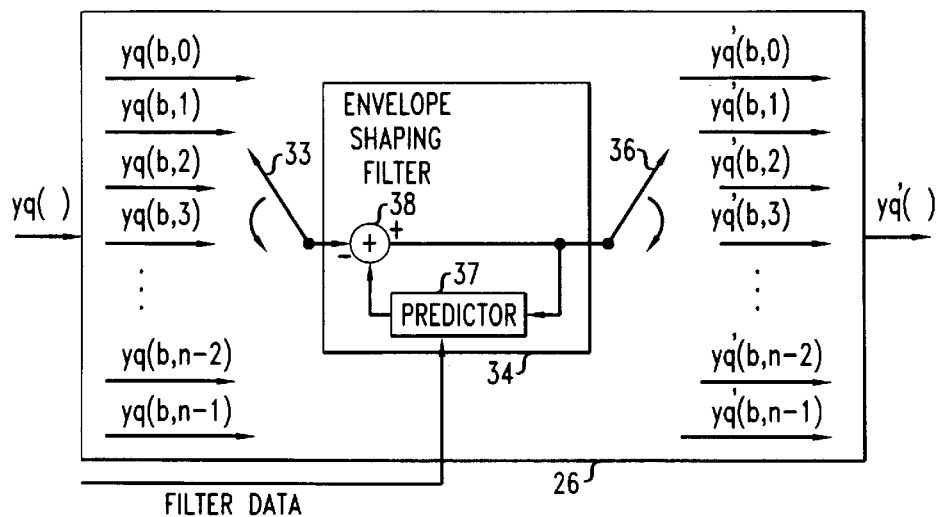
FIG. 6 shows an illustrative implementation of the inverse predictive filters of the illustrative decoder of FIG. 5.

FIG. 6 shows an illustrative implementation of the inverse predictive filters of the illustrative decoder of FIG. 5. Specifically, within the inverse predictive filters, a linear filtering operation is performed across frequency (as opposed to performing predictive coding across time as in subband-ADPCM coders). In a similar manner to that shown in the prediction filter implementation of FIG. 3, "rotating switch" 33 of FIG. 6 is used to bring the spectral values yq(b,0 . . . n−1) into a serial order prior to processing, and "rotating switch" 36 of the figure is used to bring the resulting output values yq'(b,0 . . . n−1) into a parallel order thereafter. (Once again, note that the use of "rotating switches" as a mechanism for conversion between serial and parallel orderings is provided herein only for the purpose of convenience and ease of understanding. As will be obvious to those of ordinary skill in the art, no such physical switching device need be provided. Rather, conversions between serial and parallel orderings may be performed in any of a number of conventional ways familiar to those skilled in the art, including by the use of software alone). Again, as in the case of the illustrative encoder described above, processing in order of increasing or decreasing frequency is possible, as well as other possible orderings obvious to those skilled in the art.

Specifically, as can be seen from the figure, the output values, yq'(b,0 ... n−1), are computed from the input values, yq(b,0 ... n−1), by applying the inverse of the envelope pre-whitening filter used in the corresponding encoder. In particular, the output values are computed from the input values by adding (with use of adder 38) the predicted values (predicted by predictor 37) to the input values as shown. Note that the combination of predictor 37 and adder 38, labelled in the figure as envelope shaping filter 34, functions to re-introduce the temporal shape of the original time signal.

As described above in the discussion of the illustrative encoder of FIGS. 2 and 3, the above-described filtering process can be performed either for the entire spectrum (i.e., for all spectral coefficients), or for only a portion of the spectrum (i.e., a subset of the spectral coefficients). Moreover, different predictor filters (e.g., different predictors 37 as shown in FIG. 6) can be used for different parts of the signal spectrum. In such a case (in order to execute the proper decoding of the signal), the illustrative decoder of FIG. 5 advantageously decodes from the bitstream the additional side information (labelled in the figure as "L Filter Data" and "R Filter Data") which had been transmitted by the encoder, and supplies this data to inverse predictive filters 26l and 26r. In this manner, predictive decoding can be applied in each specified target frequency range with a corresponding prediction filter.

Figure 8:
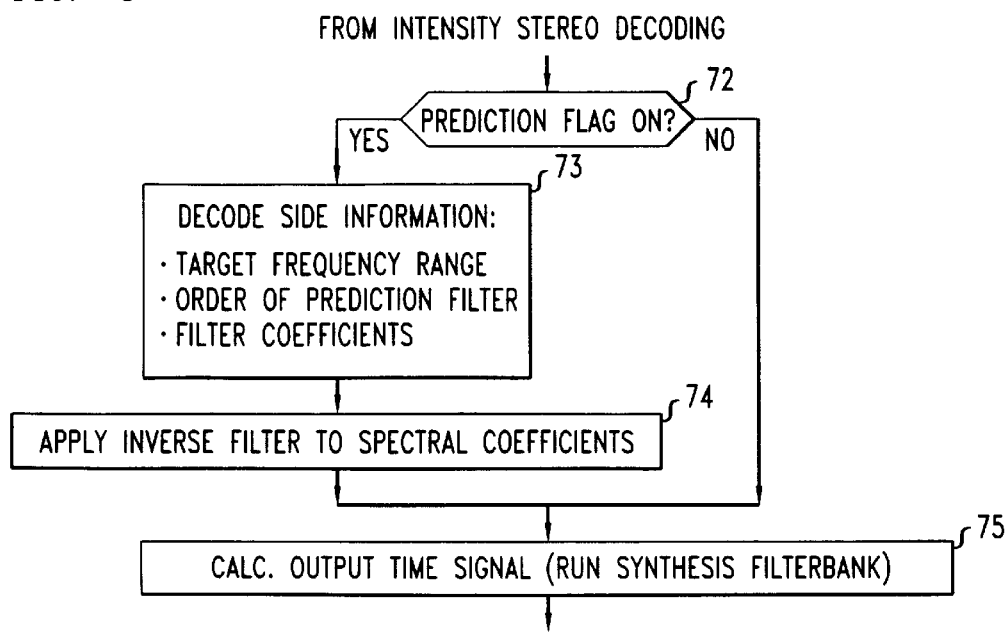
FIG. 8 shows a flow chart of a method of decoding joint stereo coded signals, corresponding to the illustrative encoding method shown in FIG. 7, in accordance with an illustrative embodiment of the present invention.

FIG. 8 shows a flow chart of a method of decoding joint stereo coded signals, corresponding to the illustrative encoding method shown in FIG. 7, in accordance with an illustrative embodiment of the present invention. The illustrative example shown in this flow chart implements certain relevant portions of the illustrative decoder of FIG. 5. Specifically, the flow chart shows the back-end portion of the decoder for a single one of the channels, including the envelope shaping process using a single (inverse) prediction filter. The processing which is performed by the decoder prior to those steps shown in the flow chart of FIG. 8 comprises conventional steps performed in prior art decoders (such as those carried out by the decoder of FIG. 4)—that is, the bitstream is decoded/demultiplexed, the resultant data is decoded and inverse quantized, and the intensity stereo decoding process is performed. Note, however, that bitstream decoder/demultiplexer 25 of the illustrative decoder of FIG. 5 replaces conventional bitstream decoder/demultiplexer 21 of the prior art decoder of FIG. 4, so that the additional side information provided by the encoder (e.g., "L Filter Data" and "R Filter Data") may be advantageously decoded and provided to inverse predictive filters 26l and 26r.

After the intensity stereo decoding has been completed, the data from the bitstream which signals the use of predictive filtering is checked (by decision 72). If the data indicates that predictive filtering was performed in the encoder (i.e., the "prediction flag" is on), then the extended decoding process of steps 73 and 74 is carried out. Specifically, the target frequency range of the prediction filtering, the order of the pre-whitening (prediction) filter, and information describing the coefficients of the filter are retrieved from the (previously decoded) side information (step 73). Then, the inverse (decoder) prediction filter (i.e., the envelope shaping filter) is applied to the range of spectral coefficients matching the target frequency range (step 74). In either case (i.e., whether predictive filtering was performed or not), the decoder processing completes by running the synthesis filterbank (for each channel) from the spectral coefficients (as processed by the envelope shaping filter, if applicable), as shown in step 75.

Conclusion

Using the above-described process in accordance with the illustrative embodiments of the present invention (i.e., predictive filtering in the encoder and inverse filtering in the decoder), a straightforward envelope shaping effect can be achieved for certain conventional block transforms including the Discrete Fourier Transform (DFT) or the Discrete Cosine Transform (DCT), both well-known to those of ordinary skill in the art. If, for example, a perceptual coder in accordance with the present invention uses a critically subsampled filterbank with overlapping windows—e.g., a conventional Modified Discrete Cosine Transform (MDCT) or another conventional filterbank based on Time Domain Aliasing Cancellation (TDAC)—the resultant envelope shaping effect is subject to the time domain aliasing effects inherent in the filterbank. For example, in the case of a MDCT, one mirroring (i.e., aliasing) operation per window half takes place, and the fine envelope structure appears mirrored (i.e., aliased) within the left and the right half of the window after decoding, respectively. Since the final filterbank output is obtained by applying a synthesis window to the output of each inverse transform and performing an overlap-add of these data segments, the undesired aliased components are attenuated depending on the synthesis window used. Thus, it is advantageous to choose a filterbank window that exhibits only a small overlap between subsequent blocks, so that the temporal aliasing effect is minimized. An appropriate strategy in the encoder can, for example, adaptively select a window with a low degree of overlap for critical signals, thereby providing improved frequency selectivity. The implementation details of such a strategy will be obvious to those skilled in the art.

Although a number of specific embodiments of this invention have been shown and described herein, it is to be understood that these embodiments are merely illustrative of the many possible specific arrangements which can be devised in application of the principles of the invention. For example, although the illustrative embodiments which have been shown and described herein have been limited to the encoding and decoding of stereophonic audio signals comprising only two channels, alternative embodiments which may be used for the encoding and decoding of stereophonic audio signals having more than two channels will be obvious to those of ordinary skill in the art based on the disclosure provided herein. In addition, numerous and varied other arrangements can be devised in accordance with these principles by those of ordinary skill in the art without departing from the spirit and scope of the invention.

I claim:

1. A method of performing joint stereo coding of a multi-channel audio signal to generate an encoded signal, the method comprising the steps of:

(a) performing a spectral decomposition of a first audio channel signal into a plurality of first spectral component signals;

(b) generating a first prediction signal representative of a prediction of one of said first spectral component signals, said prediction based on one or more other ones of said first spectral component signals;

(c) comparing the first prediction signal with said one of said first spectral component signals to generate a first prediction error signal;

(d) performing a spectral decomposition of a second audio channel signal into a plurality of second spectral component signals;

(e) performing joint stereo coding of said one of said first spectral component signals and one of said second spectral component signals to generate a jointly coded spectral component signal, said coding based on the first prediction error signal; and (f) generating the encoded signal based on the jointly coded spectral component signal.

2. The method of claim 1 further comprising the steps of:

(g) generating a second prediction signal representative of a prediction of said one of said second spectral component signals, said prediction based on one or more other ones of said second spectral component signals; and (h) comparing the second prediction signal with said one of said second spectral component signals to generate a second prediction error signal;

and wherein the step of performing joint stereo coding of said one of said first spectral component signals and said one of said second spectral component signals is further based on said second prediction error signal.

3. The method of claim 1 wherein the step of performing joint stereo coding of said one of said first spectral component signals and said one of said second spectral component signals comprises performing intensity stereo coding of said one of said first spectral component signals and said one of said second spectral component signals.

4. The method of claim 1 wherein the step of generating the encoded signal based on the jointly coded spectral component signal comprises quantizing the jointly coded spectral component signal.

5. The method of claim 4 wherein said quantization of the jointly coded spectral component signal is based on a perceptual model.

6. A method of decoding an encoded signal to generate a reconstructed multi-channel audio signal, the encoded signal comprising a joint stereo coding of an original multi-channel audio signal, the method comprising the steps of:

(a) performing joint stereo decoding of the encoded signal to generate a plurality of decoded channel signals, each decoded channel signal comprising a plurality of decoded spectral component prediction error signals;

(b) generating a first spectral component signal based on one or more said spectral component prediction error signals comprised in a first one of said decoded channel signals;

(c) generating a first prediction signal representative of a prediction of a second spectral component signal, said prediction based on said first spectral component signal;

(d) generating the second spectral component signal based on the first prediction signal and on one or more of said spectral component prediction error signals comprised in the first one of said decoded channel signals; and (e) generating a first channel of the reconstructed multi-channel audio signal based on the first and second spectral component signals.

7. The method of claim 6 further comprising the steps of:

(f) generating a third spectral component signal based on one or more of said spectral component prediction error signals comprised in a second one of said decoded channel signals;

(g) generating a second prediction signal representative of a prediction of a fourth spectral component signal, said prediction based on said third spectral component signal;

(h) generating the fourth spectral component signal based on the second prediction signal and on one or more of said spectral component prediction error signals comprised in the second one of said decoded channel signals; and (i) generating a second channel of the reconstructed multi-channel audio signal based on the third and fourth spectral component signals.

8. The method of claim 6 wherein the step of performing joint stereo decoding of the encoded signal comprises performing intensity stereo decoding of the encoded signal.

9. An encoder for performing joint stereo coding of a multi-channel audio signal to generate an encoded signal, the encoder comprising:

(a) a first filterbank which performs a spectral decomposition of a first audio channel signal into a plurality of first spectral component signals;

(b) a first prediction filter which generates a first prediction signal representative of a prediction of one of said first spectral component signals, said prediction filter responsive to one or more other ones of said first spectral component signals;

(c) a first comparator which compares the first prediction signal with said one of said first spectral component signals to generate a first prediction error signal;

(d) a second filterbank which performs a spectral decomposition of a second audio channel signal into a plurality of second spectral component signals;

(e) a joint stereo coder which performs joint stereo coding of said one of said first spectral component signals and one of said second spectral component signals to generate a jointly coded spectral component signal, said coding based on the first prediction error signal; and (f) a coder which generates the encoded signal based on the jointly coded spectral component signal.

10. The encoder of claim 9 further comprising:

(g) a second prediction filter which generates a second prediction signal representative of a prediction of said one of said second spectral component signals, said prediction based on one or more other ones of said second spectral component signals; and (h) a second comparator which compares the second prediction signal with said one of said second spectral component signals to generate a second prediction error signal;

and wherein the joint stereo coder performs joint stereo coding further based on said second prediction error signal.

11. The encoder of claim 9 wherein the joint stereo coder comprises an intensity stereo coder which performs intensity stereo coding of said one of said first spectral component signals and said one of said second spectral component signals.

12. The encoder of claim 9 wherein the coder which generates the encoded signal based on the jointly coded spectral component signal comprises a quantizer which quantizes the jointly coded spectral component signal.

13. The encoder of claim 12 wherein the quantizer is based on a perceptual model.

14. A decoder for decoding an encoded signal to generate a reconstructed multi-channel audio signal, the encoded signal comprising a joint stereo coding of an original multi-channel audio signal, the method comprising:
   (a) a joint stereo decoder which performs joint stereo decoding of the encoded signal to generate a plurality of decoded channel signals, each decoded channel signal comprising a plurality of decoded spectral component prediction error signals;
   (b) means for generating a first spectral component signal based on one or more of said spectral component prediction error signals comprised in a first one of said decoded channel signals;
   (c) a first prediction filter which generates a first prediction signal representative of a prediction of a second spectral component signal, said prediction based on said first spectral component signal;
   (d) means for generating the second spectral component signal based on the first prediction signal and on one or more of said spectral component prediction error signals comprised in the first one of said decoded channel signals; and
   (e) a first filterbank which generates a first channel of the reconstructed multi-channel audio signal based on the first and second spectral component signals.

15. The decoder of claim 14 further comprising:
   (f) means for generating a third spectral component signal based on one or more of said spectral component prediction error signals comprised in a second one of said decoded channel signals;
   (g) a second prediction filter which generates a second prediction signal representative of a prediction of a fourth spectral component signal, said prediction based on said third spectral component signal;
   (h) means for generating the fourth spectral component signal based on the second prediction signal and on one or more of said spectral component prediction error signals comprised in the second one of said decoded channel signals; and
   (i) a second filterbank which generates a second channel of the reconstructed multi-channel audio signal based on the third and fourth spectral component signals.

16. The decoder of claim 14 wherein the joint stereo decoder comprises an intensity stereo decoder which performs intensity stereo decoding of the encoded signal.

17. A storage medium having an encoded signal recording thereon, the encoded signal having been generated from a multi-channel audio signal by an encoding method comprising the steps of:
   (a) performing a spectral decomposition of a first audio channel signal into a plurality of first spectral component signals;
   (b) generating a first prediction signal representative of a prediction of one of said first spectral component signals, said prediction based on one or more other ones of said first spectral component signals;
   (c) comparing the first prediction signal with said one of said first spectral component signals to generate a first prediction error signal;
   (d) performing a spectral decomposition of a second audio channel signal into a plurality of second spectral component signals;
   (e) performing joint stereo coding of said one of said first spectral component signals and one of said second spectral component signals to generate a jointly coded spectral component signal, said coding based on the first prediction error signal; and
   (f) generating the encoded signal based on the jointly coded spectral component signal.

18. The storage medium of claim 17 wherein the encoding method which generated the encoded signal stored thereon further comprises the steps of:
   (g) generating a second prediction signal representative of a prediction of said one of said second spectral component signals, said prediction based on one or more other ones of said second spectral component signals; and
   (h) comparing the second prediction signal with said one of said second spectral component signals to generate a second prediction error signal;

and wherein the step of performing joint stereo coding of said one of said first spectral component signals and said one of said second spectral component signals comprised in said encoding method is further based on said second prediction error signal.

19. The storage medium of claim 17 wherein the step of performing joint stereo coding of said one of said first spectral component signals and said one of said second spectral component signals comprised in said encoding method comprises performing intensity stereo coding of said one of said first spectral component signals and said one of said second spectral component signals.

20. The storage medium of claim 17 wherein the step of generating the encoded signal based on the jointly coded spectral component signal comprised in said encoding method comprises quantizing the jointly coded spectral component signal.

21. The storage medium of claim 20 wherein said quantization of the jointly coded spectral component signal comprised in said encoding method is based on a perceptual model.

22. The storage medium of claim 17 wherein the storage medium comprises a compact disc.

23. The storage medium of claim 17 wherein the storage medium comprises a digital audio tape.

24. The storage medium of claim 17 wherein the storage medium comprises a semiconductor memory.

* * * * *